(12) United States Patent
Nakamura et al.

(10) Patent No.: US 11,849,047 B2
(45) Date of Patent: Dec. 19, 2023

(54) CERTIFYING AUTHENTICITY OF DATA MODIFICATIONS

(71) Applicant: International Business Machines Corporation, Armonk, NY (US)

(72) Inventors: Hiroaki Nakamura, Tokyo (JP); Takaaki Tateishi, Yamato (JP)

(73) Assignee: International Business Machines Corporation

( * ) Notice: Subject to any disclaimer, the term of this patent is extended or adjusted under 35 U.S.C. 154(b) by 218 days.

(21) Appl. No.: 16/154,927

(22) Filed: Oct. 9, 2018

(65) Prior Publication Data
US 2020/0112440 A1    Apr. 9, 2020

(51) Int. Cl.
*H04L 9/32* (2006.01)
*H04L 9/00* (2022.01)

(52) U.S. Cl.
CPC .......... *H04L 9/3247* (2013.01); *H04L 9/3236* (2013.01); *H04L 9/50* (2022.05)

(58) Field of Classification Search
CPC . H04L 9/3236; H04L 9/3247; H04L 2209/38; H04L 9/0891; H04L 9/3239
See application file for complete search history.

(56) References Cited

U.S. PATENT DOCUMENTS

| 8,725,682 | B2* | 5/2014 | Young | G06F 16/1834 |
| | | | | 707/610 |
| 10,163,080 | B2 | 12/2018 | Chow et al. | |
| 11,290,279 | B2 | 3/2022 | Yoon | |
| 2006/0265366 | A1* | 11/2006 | Winkelman | G06F 40/103 |
| 2007/0112675 | A1* | 5/2007 | Flinn | G06Q 10/10 |
| | | | | 705/50 |
| 2010/0005318 | A1* | 1/2010 | Hosain | H04L 9/088 |
| | | | | 713/193 |
| 2011/0072278 | A1 | 3/2011 | Izu et al. | |
| 2011/0078458 | A1 | 3/2011 | Furukawa et al. | |
| 2013/0132335 | A1 | 5/2013 | Yang et al. | |
| 2015/0379510 | A1 | 12/2015 | Smith | |
| 2016/0085955 | A1* | 3/2016 | Lerner | G06F 21/725 |
| | | | | 726/20 |
| 2016/0226909 | A1* | 8/2016 | Pravetz | G06F 21/6218 |
| 2016/0283920 | A1* | 9/2016 | Fisher | G06Q 20/02 |
| 2016/0330027 | A1 | 11/2016 | Ebrahimi | |
| 2017/0005804 | A1* | 1/2017 | Zinder | H04L 63/123 |
| 2017/0103385 | A1* | 4/2017 | Wilson, Jr. | G06Q 20/3678 |

(Continued)

FOREIGN PATENT DOCUMENTS

CN    106844523 A    6/2017

OTHER PUBLICATIONS

IP.com Search Query; Jul. 15, 2020 (Year: 2020).*

(Continued)

*Primary Examiner* — Taghi T Arani
*Assistant Examiner* — Blake I Narramore

(57) ABSTRACT

An example operation may include one or more of modifying content of a data file from an initial content state to a modified content state, determining a relationship value which identifies a relationship of the modified content state with respect to the initial content state of the data file, signing the relationship value with a private key of a data modifier, and transmitting the signed relationship value to a blockchain peer node for inclusion within one or more data blocks among a hash-linked chain of data blocks.

11 Claims, 20 Drawing Sheets

(56) References Cited

U.S. PATENT DOCUMENTS

| | | | | |
|---|---|---|---|---|
| 2017/0126702 | A1* | 5/2017 | Krishnamurthy | H04L 63/123 |
| 2017/0237569 | A1* | 8/2017 | Vandervort | H04L 9/3247 |
| | | | | 713/171 |
| 2017/0264428 | A1* | 9/2017 | Seger | G06F 16/13 |
| 2017/0364699 | A1* | 12/2017 | Goldfarb | G06F 16/2282 |
| 2018/0034642 | A1* | 2/2018 | Kaehler | H04L 63/1408 |
| 2018/0046766 | A1* | 2/2018 | Deonarine | H04L 9/0643 |
| 2018/0109516 | A1* | 4/2018 | Song | H04L 63/0823 |
| 2018/0159688 | A1* | 6/2018 | Staple | H04L 9/3236 |
| 2018/0205552 | A1* | 7/2018 | Struttmann | H04L 9/0637 |
| 2018/0220278 | A1* | 8/2018 | Tal | H04L 9/3297 |
| 2018/0337770 | A1 | 11/2018 | Bathen et al. | |
| 2018/0337787 | A1* | 11/2018 | Uhr | G06Q 20/02 |
| 2019/0171739 | A1* | 6/2019 | Cochrane | G06F 16/2255 |
| 2019/0280855 | A1* | 9/2019 | Tong | H04L 9/0637 |
| 2020/0044833 | A1* | 2/2020 | Shpurov | H04L 9/0836 |
| 2020/0076828 | A1 | 3/2020 | Nainar et al. | |

OTHER PUBLICATIONS

List of IBM Patents or Patent Applications Treated as Related, Oct. 17, 2018.

H. Nakamura et al., "Certifying Authenticity of Data Modifications", U.S. Appl. No. 16/155,011, filed Oct. 9, 2018 (a copy is not provided as this application is available to the Examiner).

H. Nakamura et al., "Certifying Authenticity of Data Modifications", U.S. Appl. No. 16/154,912, filed Oct. 9, 2018 (a copy is not provided as this application is available to the Examiner).

* cited by examiner

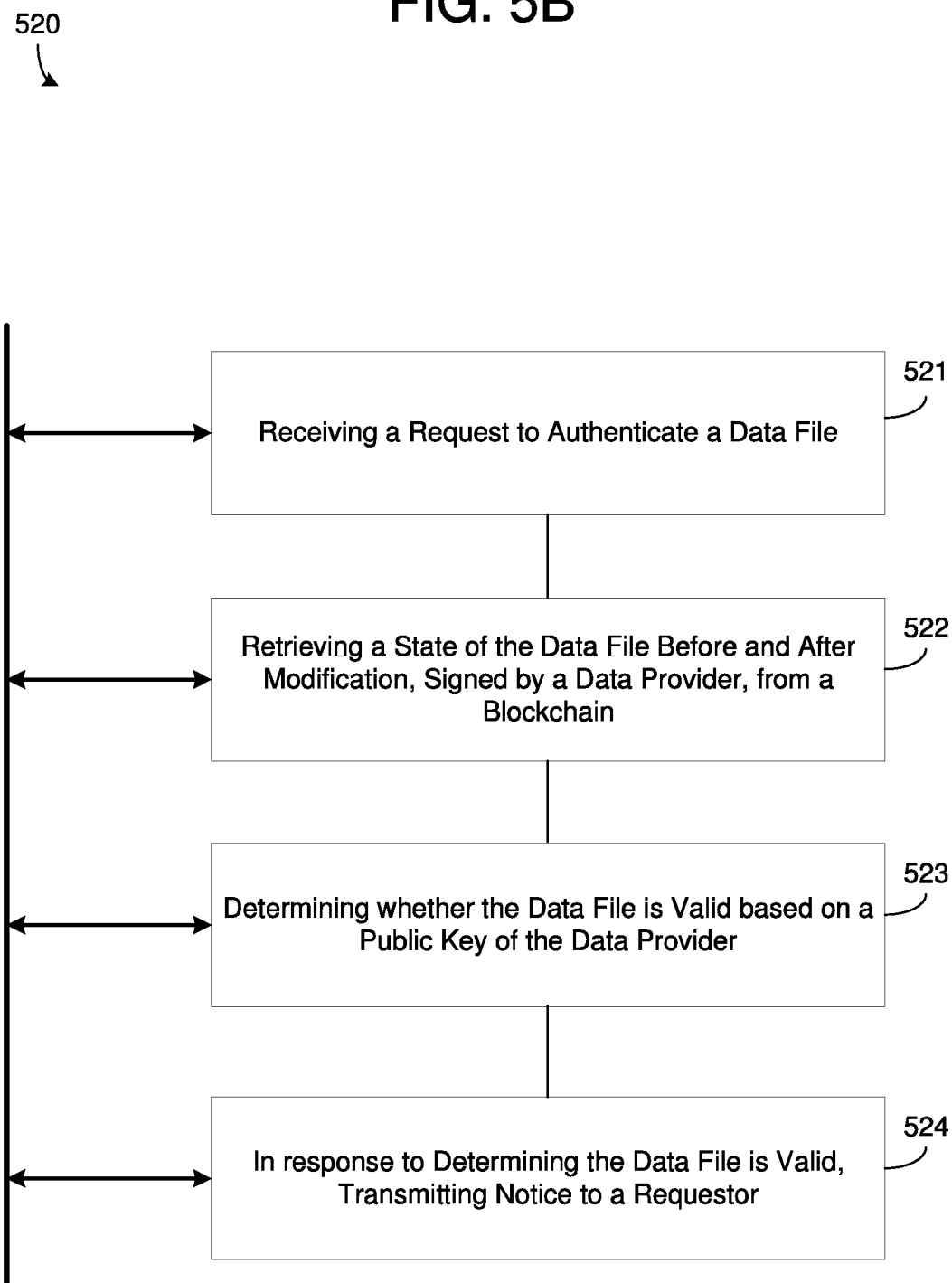

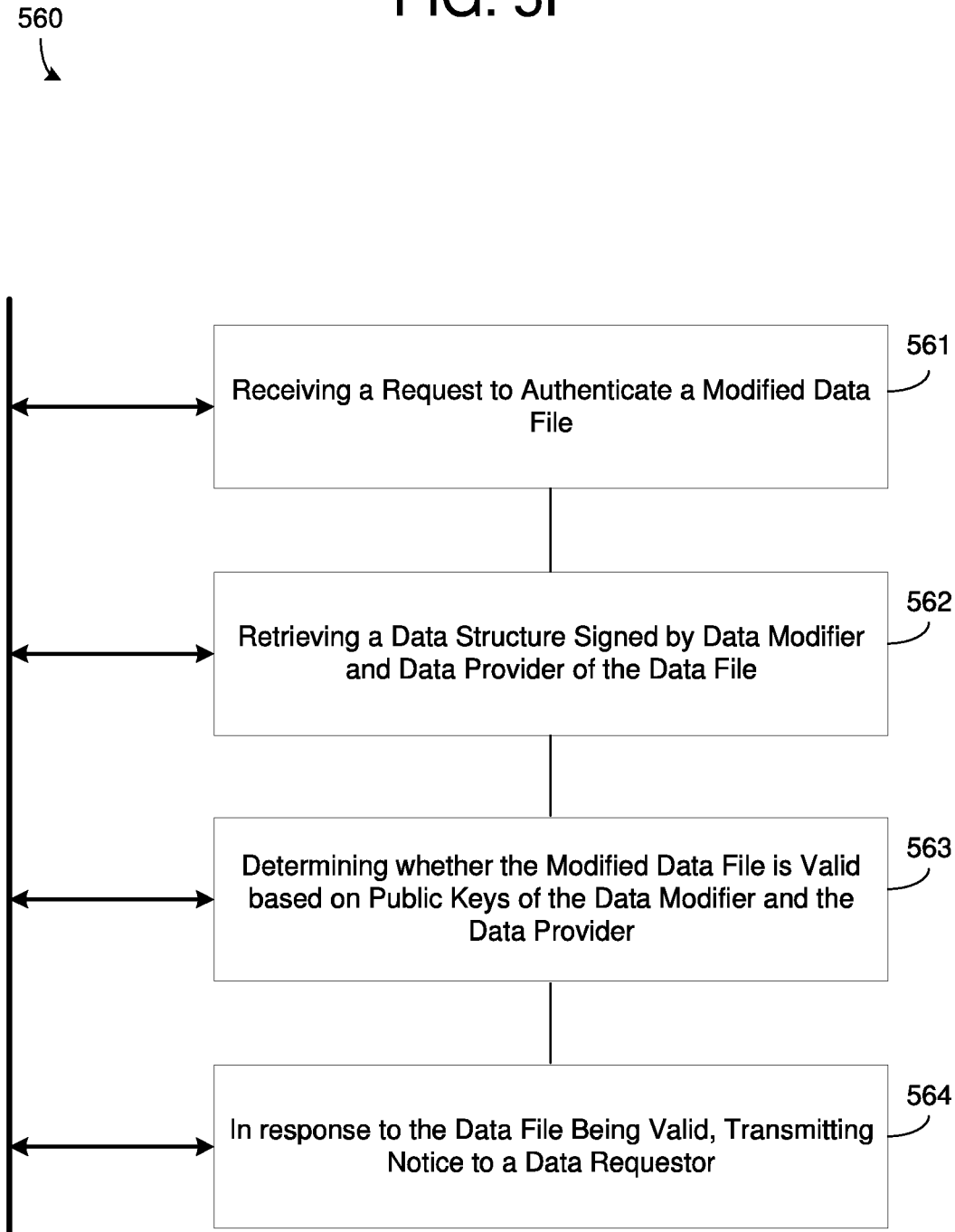

CERTIFYING AUTHENTICITY OF DATA MODIFICATIONS

TECHNICAL FIELD

This application generally relates to a database storage system, and more particularly, to a decentralized database such as a blockchain in which modifications to external data may be validated based on a blockchain network.

BACKGROUND

A centralized database stores and maintains data in one single database at one location. This location is often a central computer, for example, a desktop central processing unit (CPU), a server CPU, or a mainframe computer. Information stored on a centralized database is typically accessible from multiple different points. For example, multiple users or client workstations can work simultaneously on the centralized database based on a client/server configuration. Because of its single location, a centralized database is easy to manage, maintain, and control, especially for purposes of security. Within a centralized database, data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks can occur when the centralized database experiences high traffic. Furthermore, the centralized database provides limited access to data because only one active/productive copy of the data is maintained. As a result, multiple users may not be able to access the same piece of data at the same time without creating problems such as overwriting necessary data. Furthermore, because a central database has minimal to no data redundancy, if a set of data is unexpectedly lost can be difficult to retrieve other than through manual operation from back-up disk storage.

A decentralized database such as a blockchain system provides a storage system capable of addressing the drawbacks of a centralized database. In a blockchain system, multiple peer nodes store a distributed ledger which includes a blockchain. Clients interact with peer nodes to gain access to the blockchain. The peer nodes may be controlled by different entities who have different interests and are not necessarily trusting of one another. Furthermore, there is no central authority in a blockchain. Therefore, in order for data to be added to or changed on the distributed ledger in a trusted manner, a consensus of peer nodes must occur. The consensus provides a way for trust to be achieved in a blockchain system of untrusting peer nodes.

In some cases, transactions which are performed between parties via a blockchain may require data from an external source (e.g., stocks, medical information, property information, images, and the like). At present, it is difficult for a blockchain to determine whether the external source or the data provided from the external source is reliable. In other words, the blockchain typically "takes the word" of the external data source. Furthermore, external data may be modified by a different party than the party that created the data. In this case, the modification introduces an additional security issue because the modification can be fraudulent, an error, etc. Therefore, a mechanism is needed that can verify whether a modification to an external data source is an authentic modification.

SUMMARY

One example embodiment may provide a computing system that includes one or more of a processor configured to one or more of modify content of a data file from an initial content state to a modified content state, determine a relationship value which identifies a relationship of the modified content state with respect to the initial content state of the data file, and sign the relationship value with a private key of a data modifier, and a network interface configured to transmit the signed relationship value to a blockchain peer node for inclusion within one or more data blocks among a hash-linked chain of data blocks.

Another example embodiment may provide a method that includes one or more of modifying content of a data file from an initial content state to a modified content state, determining a relationship value which identifies a relationship of the modified content state with respect to the initial content state of the data file, signing the relationship value with a private key of a data modifier, and transmitting the signed relationship value to a blockchain peer node for inclusion within one or more data blocks among a hash-linked chain of data blocks.

A further example embodiment may provide a non-transitory computer readable medium comprising instructions, that when read by a processor, cause the processor to perform one or more of modifying content of a data file from an initial content state to a modified content state, determining a relationship value which identifies a relationship of the modified content state with respect to the initial content state of the data file, signing the relationship value with a private key of a data modifier, and transmitting the signed relationship value to a blockchain peer node for inclusion within one or more data blocks among a hash-linked chain of data blocks.

Another example embodiment may provide a computing system that includes one or more of a network interface configured to receive a request to authenticate a data file which has been modified, and a processor configured to one or more of retrieve a relationship value of the data file which has been signed with a private key of a data modifier and stored in one or more blocks of a hash-linked chain of blocks, where the relationship value identifies a relationship between a state of the data file after modification with respect to a state of the data file before modification, and determine whether the relationship value is valid based on a public key of the data modifier, wherein, in response to a determination that the relationship value is valid, the processor may be further configured to control the network interface to transmit information about the data file to a data requestor.

Another example embodiment may provide a method that includes one or more of receiving a request to authenticate a data file which has been modified, retrieving a relationship value of the data file which has been signed with a private key of a data modifier and stored in one or more blocks of a hash-linked chain of blocks, where the relationship value identifies a relationship between a state of the data file after modification with respect to a state of the data file before modification, determining whether the relationship value is valid based on the signature of the data modifier, and in response to determining the relationship value is valid, transmitting information about the data file to a data requestor.

BRIEF DESCRIPTION OF THE DRAWINGS

FIG. 5B is a diagram illustrating a method of authenticating a data file based on a data provider signature, according to example embodiments.

FIG. 5F is a diagram illustrating a method of authenticating a data file based on signatures of a data provider and a data modifier according to example embodiments.

DETAILED DESCRIPTION

Figure 1:
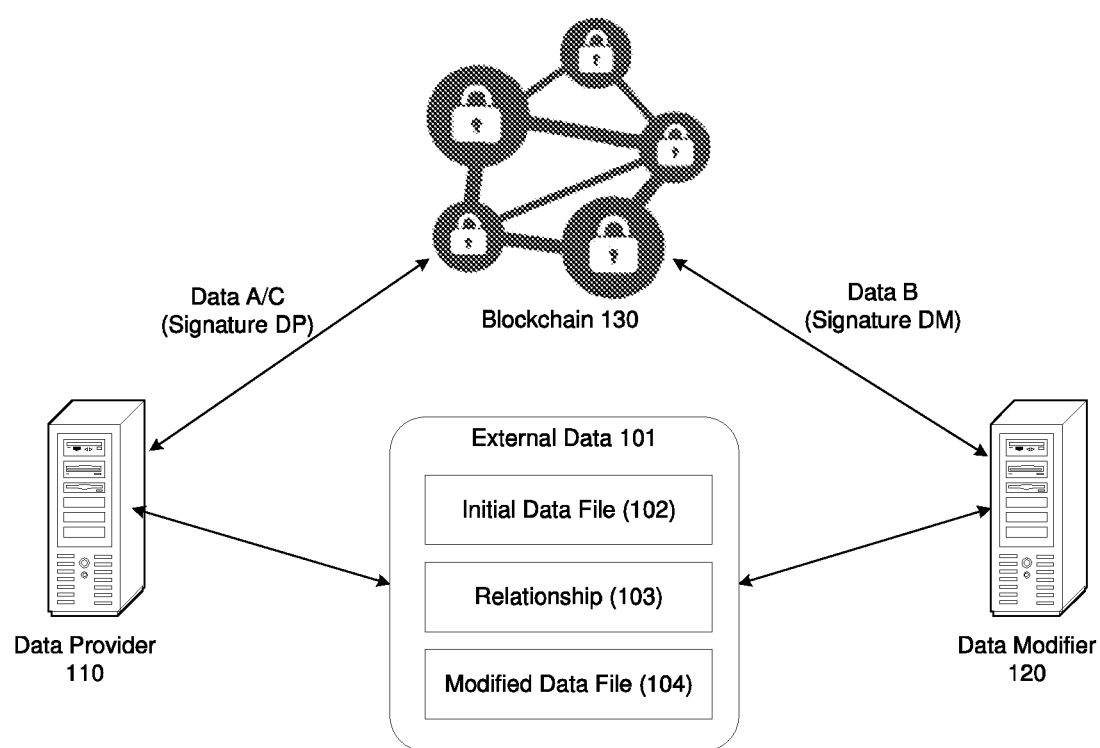
FIG. 1 is a diagram illustrating of a blockchain environment that stores external data, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which provide for certifying the authenticity of a modification to a data file which is modified prior to being stored on a blockchain.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

External data is often used as a factor in execution of transactions and other requests via a blockchain. For example, at a time of contract, the transaction conditions such as an amount may be decided based on data provided by a third party. This is just one example of an external data provider. Other examples include, but are not limited to, stocks, insurance, medical information, financial data, weather, and the like. External data created by a first party (data provider) is often modified by a second party (data modifier). However, it is difficult to ensure that such modification is valid. In other words, the modification could be the result of an error or malicious intent by another entity to negatively influence a transaction. Therefore, it may be desirable for a client transacting on a blockchain to know a reliability of modifications that are made to external data.

The example embodiments overcome these drawbacks by providing a mechanism for certifying the authenticity of modified data files via a blockchain. A data file may be generated by a data provider and modified by a separate entity referred to as a data modifier. As an example, a photo may be created by a data provider, and a memo may be added to the photo by a data modifier. In this case, an authenticity of both the photo and the modification may be certified via a blockchain. For example, express data modifications may be stored as a triple of (a) data before modification, (b) data after modification, and (c) a relationship between (a) and (b). Here, the data provider may add a signature to the data values of (a) and (b) to generate a hash of (a) and (b), which will be used for certifying authenticity of the data, and the data modifier may generate a data structure that hold the hash values of (a) and (b), and add a signature to the data structure, which will be used for certifying authenticity of data modifications. The data, the relationship, and the signatures may be stored on the blockchain and used by a smart contract to verify authenticity of the modified data file in response to a request from a data requestor such as a transacting party relying on the data.

Some benefits of the instant solutions described and depicted herein include enhancing the security and trust of data from outside a blockchain (off-chain) by creating an immutable record of modifications to a data file that is stored via the blockchain. In particular, a state of the data file before modification and a state of the data file after modification can be signed by the data provider and stored on the blockchain. In addition, a relationship between the data file after modification with respect to the data file before modification can be created and signed by the data modifier, and stored on the blockchain. Therefore, when a data inspector requests the authenticity of the modified data file (e.g., during a blockchain transaction, etc.) a blockchain peer node (or group of nodes) may execute a smart contract that retrieves the state of the data file before and after modification from the blockchain, and decrypts it using a public key of the data provider. Likewise, the blockchain peer node can retrieve the relationship of the modification from the blockchain and decrypt it using a public key of the data modifier. Furthermore, the peer node may compare the data before modification and the data after modification with the relationship to determine if the two are the same. As a result, an authentication can be performed in a trusted and secure manner.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, a smart contract can be used to register information of a modification to a data file with the blockchain, and authenticate/certify the modification to the data file via the blockchain in response to a request.

FIG. 1 illustrates a blockchain environment 100 that stores external data 101, according to example embodiments. Referring to FIG. 1, the blockchain network 100 includes a blockchain 130 which may be implemented via a plurality of blockchain peer nodes and one or more ordering nodes which communicate via a blockchain network such as the Internet, a private network, and/or the like. Here, the peer nodes may correspond to different untrusting entities, but embodiments are not limited thereto. Each peer node may be capable of acting as a submitting node (client node) for submitting transactions for storage on the blockchain 130. The blockchain 130 may be stored within a distributed ledger which is replicated among all of the peer nodes. Each of the peer nodes may also be capable of acting as an endorsing node.

According to various embodiments, a data provider 110 may create an initial data file 102 and provide the initial data file 102 having an initial content state to a data modifier 120. The data modifier may create a modified data file 104 which includes an alteration to the initial content of the initial data file 102. The initial data file 102 may include an image/photo, a document (word, spreadsheet, .pdf, etc.), an audio file, a video file, or the like. As a non-limiting example, the alteration may include an insertion, a deletion, a modification, or the like, to content within the initial data file 102 which is used to generate the modified data file 104. In addition, the data modifier 120 may create a relationship value 103 which describes a relationship between the initial content state of the data file 102 with respect to the modified content state of the data file after modification 104.

In the example of FIG. 1, the data provider 110 may sign the initial data file 102 with a private key of the data provider 110 to generate a hash value of the initial data file 102. Furthermore, the data provider 110 may sign the modified data file 104 with the private key of the data provider 110 to generate a hash value of the modified data file 104. Likewise, the data modifier 120 may sign the relationship value 103 with a private key of the data modifier 120 to generate a hash value of the relationship value 103. The hash values of the initial data file 102, the relationship 103, and the modified data file 104 may be stored on the blockchain 130.

For example, one or more of the data provider 110 and the data modifier 120 may provide the information to the blockchain 130. Accordingly, a content state of the data file before modification, a content state of the data file after modification, and a relationship between the two states may be stored within one or more transactions of the blockchain 130.

When a party requests authentication of the modified data file, a smart contract executing on a blockchain peer node may determine whether the modified data file is authentic. In particular, the smart contract may decrypt the hashed initial state of the data file and the hashed modified state of the data file using a public key of the data provider 110. Furthermore, the smart contract may decrypt the relationship value (and possible hashes of the data file before and after modification) which are also provided from the data modifier 120. After decrypting both sets of data, the smart contract may compare the two for a match. If so, the modified data file is considered to be authentic. In other words, if the hashes of the initial and modified state of the data file provided from the data provider 110 match the relationship described by the data modifier 120, the file is authentic.

Figure 2A:
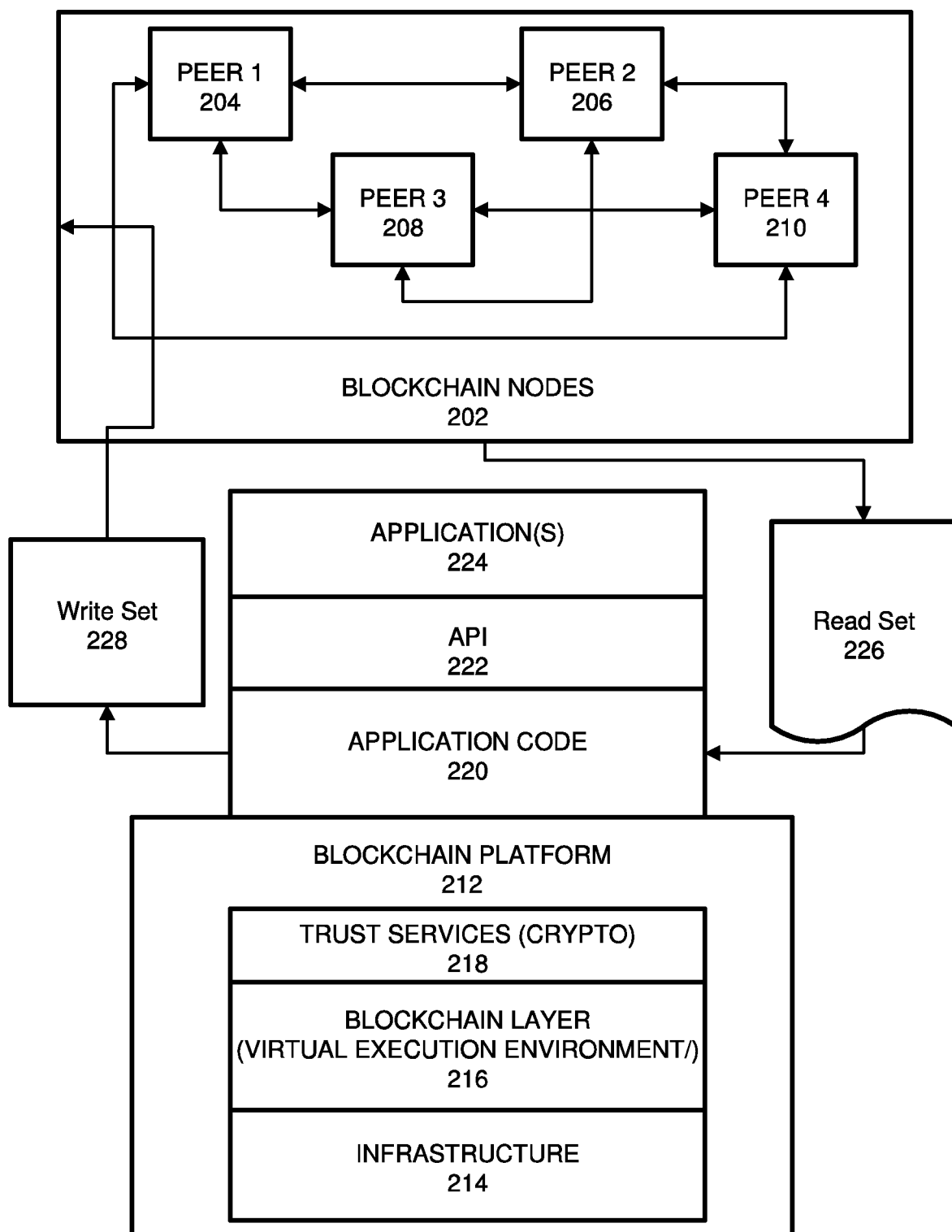
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the smart contracts can be used to store and update modified data file information from an external data source such as from a data provider and/or a data modifier. For example, a read set 226 may be processed by one or more processing entities (e.g., virtual machines) included in the blockchain layer 216. A write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified. According to various embodiments, the read set 226 may include data about a modified file that is read from a blockchain and previously provided by one or more of a data provider and a data modifier. Meanwhile, the write set 228 may include the results of decrypting the modified data with a public key.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
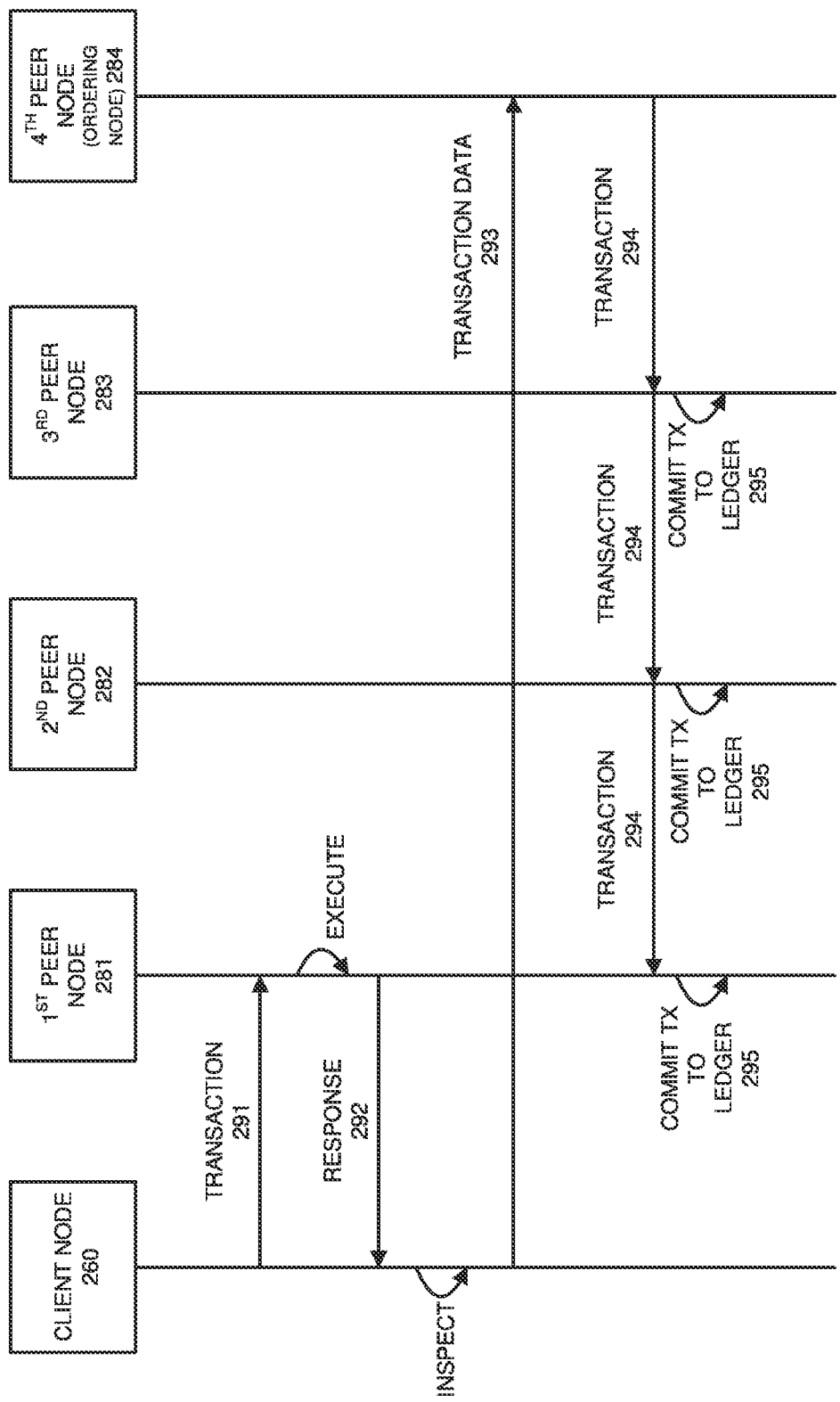
FIG. 2B is a diagram illustrating a peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

The client node 260 may initiate the transaction 291 by constructing and sending a request to the peer node 281, which is an endorser. The transaction proposal 291 may include a request to store information about a modified data file (e.g., initial data file 102, relationship 103, modified data file 104, etc.). As another example, the transaction proposal 291 may be a request to authenticate a modified data file previously stored on the blockchain. There may be more than one endorser, but one is shown here for convenience. The client 260 may include an application that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID, as well as the timestamp information and modified data file information described herein. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
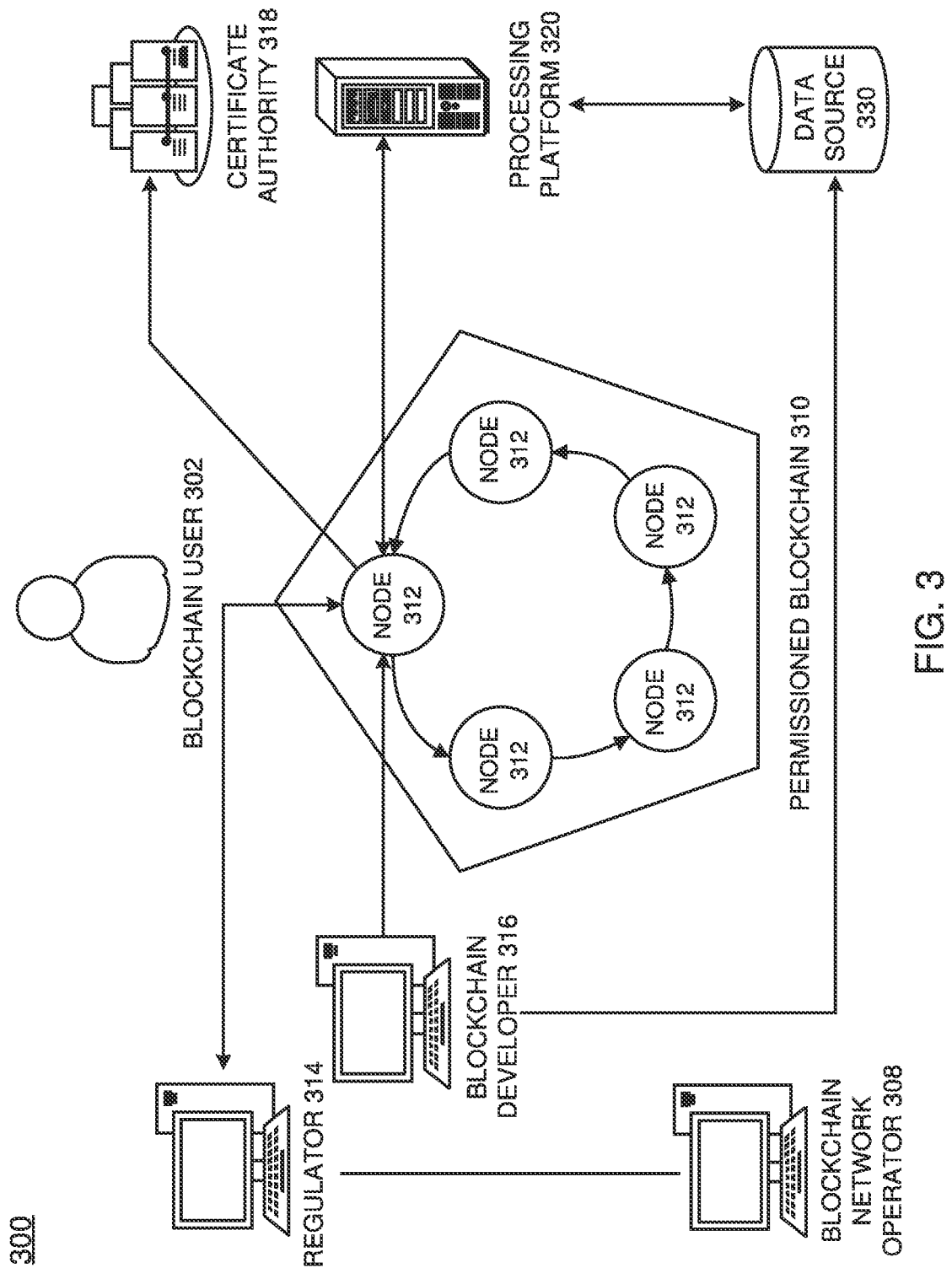
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
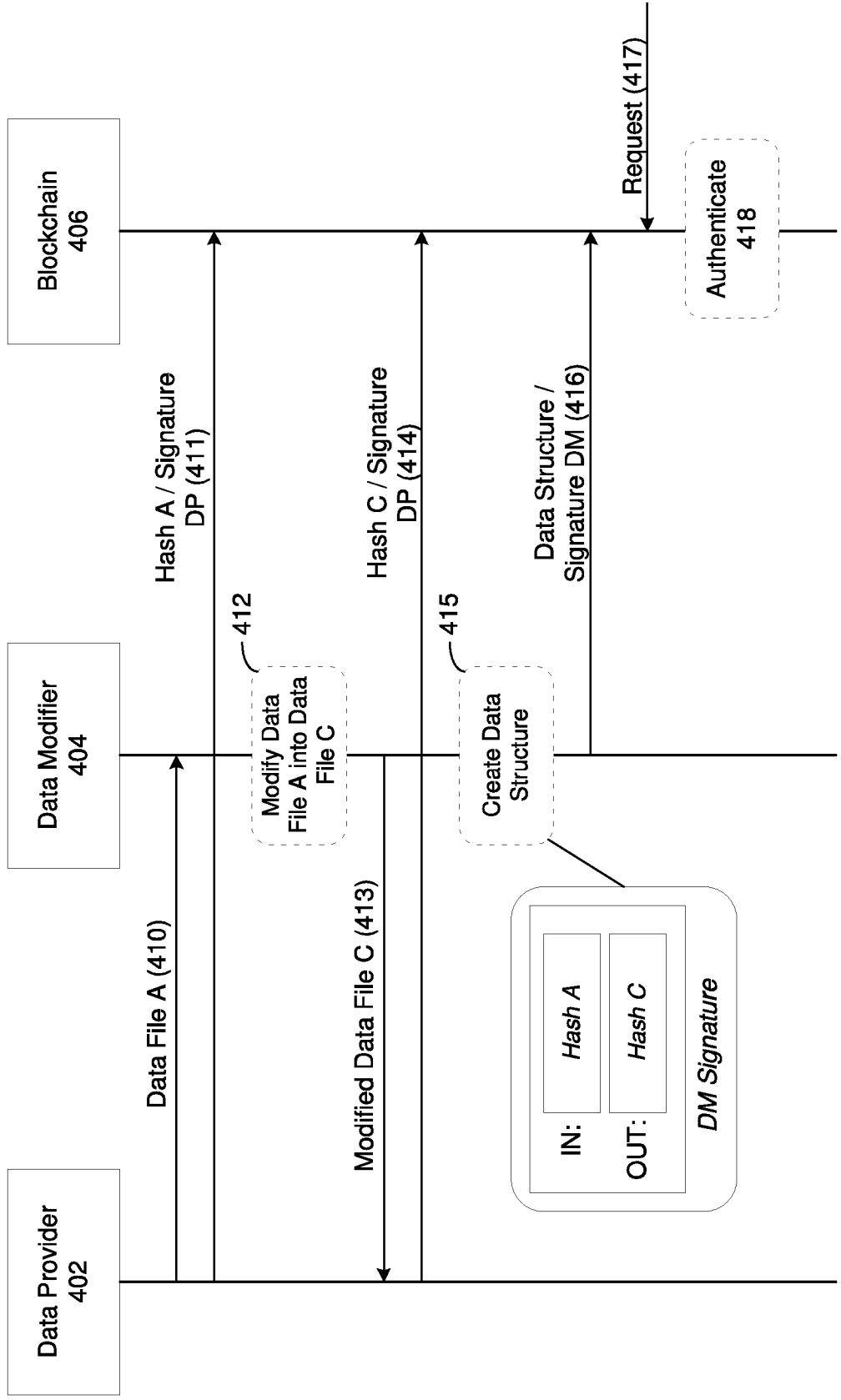
FIG. 4A is a diagram illustrating a process of a data provider generating and storing hash values of a modified file on a blockchain according to example embodiments.

FIG. 4A illustrates a process 400A of a data provider 402 generating and storing hash values of a modified file on a blockchain 406 according to example embodiments. Referring to FIG. 4A, the data provider 402 may generate a data file and forward the data file to a data modifier 404, in 410. Furthermore, in 411, the data provider 402 may also sign the data file with a private key of the data provider 402 to generate a hashed data file and transmit the hashed data file to the blockchain 406 with an ID of the signature, in 402. The blockchain 406 may register the hashed value of the data file within a chain of blocks on a distributed ledger, via a smart contract execution. In 412, the data modifier 404 may modify an initial content state of the data file to generate a modified data file having a modified content state. Here, the modification may include an alteration such as an addition of content, a modification to content, a deletion of content, or the like, from a data file which may include a photo, a document, an audio, a video, or the like. In 413, the data modifier 404 may transmit the modified data file to the data provider 402. In 414, the data provider 402 may compute the hash value of the modified data file by signing the modified data file with a private key of the data provider 402 and forward the hashed value of the modified data file and the ID of the signature to the blockchain 406 for storage/registration.

In 415, the data modifier 404 may create a data structure which includes a hash value of the initial content state of the data file, and the hash value of the modified content state of the modified data file. Here, the data modifier 404 may use its own private key to create a hash of the combination of the data file before and the data file after modification. Furthermore, the data modifier 404 may sign the created data structure with a private key of the data modifier 404 and append an ID of its signature to the data structure. In 416, the data modifier 404 may transmit the hashed data structure to the blockchain 406 for registration. Here, the data structure may be included in a transaction.

Subsequently, a data inspector or data requestor may request certification of the modification to the data file, in 417. For example, the data requester may be a party of a transaction being performed via the blockchain. In 418, the blockchain 406 (e.g., peer nodes of the blockchain network) may authenticate the modified data file based on the content registered with the blockchain 406 during the transactions of 411, 414, and 416. Here, the authentication may be performed by execution of a smart contract on each of the blockchain peer nodes. For example, the smart contract may certify authenticity of the data file before modification and the data file after modification by decrypting the states of the data file stored in 411 and 414 with a public key of the data provider 402. Furthermore, the smart contract may certify the authenticity of the data structure provided in 416 by decrypting the data structure using a public key of the data modifier 404 provided in 416. Next, the smart contract may compare the hash values provided from the data provider 402 with the hash values included in the data structure provided from the data modifier 404, to determine if they are the same. The result of the validity determination can be provided back to the data requestor. Here, if the hash values initially registered by the data provider 402 are a match with the hash values provided from the data provider 404, the modified data file is considered authentic.

Figure 4B:
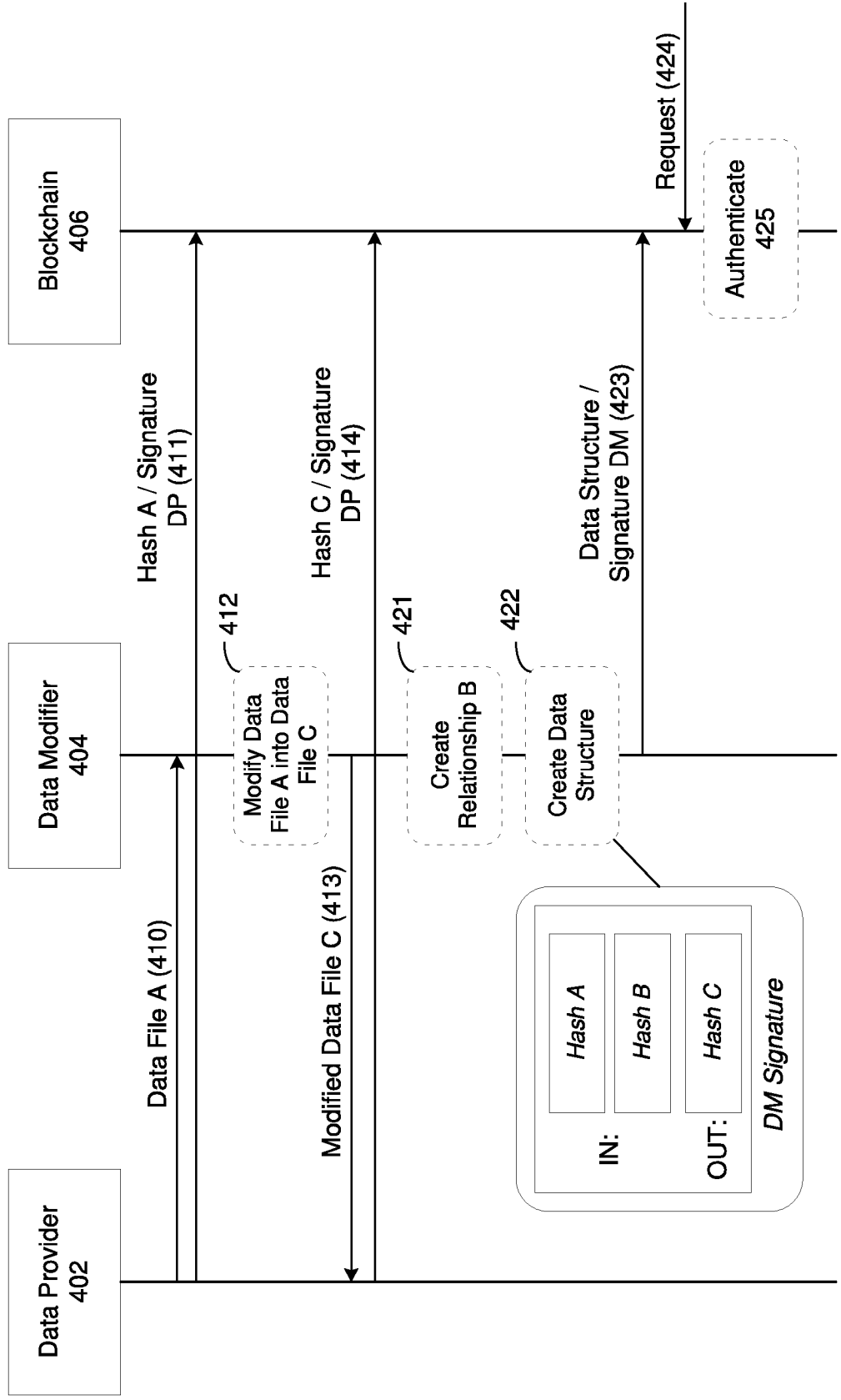
FIG. 4B is a diagram illustrating a process of a data modifier generating a relationship of a modified file and storing it on a blockchain according to example embodiments.

FIG. 4B illustrates a process 400B of a data modifier 404 generating a relationship of a modified file and storing it on a blockchain according to example embodiments. The process 400B is a variation of the process 400A. Here, steps 410-414 are the same as included in process 400A. However, in this example, the data modifier 404 creates a relationship value, in 421. The relationship value may include a description, a tag, or the like, which identifies a difference between the modified data file with respect to the initial data file. In other words, the relationship may include a description of how the content of the data file has been modified. In some embodiments, the relationship may include a URI which points to a network location of the description of how the content of the data file has been modified. The description may include words, sentences, hashtags, or the like, which identify how the file is different. For example, a simple description may be "the modified document A includes the initial document that has been modified by adding a signature in the box at the bottom right of page 1."

In 422, the data modifier 404 may create a data structure which includes a hash value of the data file before modification, a hash value of the data file after modification, and a hash of the relationship value. These hashes may be created by the data modifier 404. Furthermore, the data modifier 404 may sign the data structure with a private key of the data modifier 404 and transmit the hashed data structure to the blockchain 406, in 423. Similar to the process described in 417 and 418, the blockchain 406 may receive a request to authenticate the modified data file and an authentication may be performed in 424 and 425. However, in this example, the authentication in 425 may further be performed based on the relationship value created in 422 and supplied to the blockchain 406, in 423. The hashes from the data provider 402 may be decrypted with a public key of the data provider 402 and the hashes of the data modifier 404 including hashed relationship value may be decrypted using a public key of the data modifier 404. The hashes of the data file before and after modification may be compared to determine if they are the same. Furthermore, the decrypted relationship value may be used in addition to the hash values of the data file before and after modification. The smart contract may traverse links between the relationship and the data file before modification, and the relationship and the data file after modification to verify the data modification.

Figure 4C:
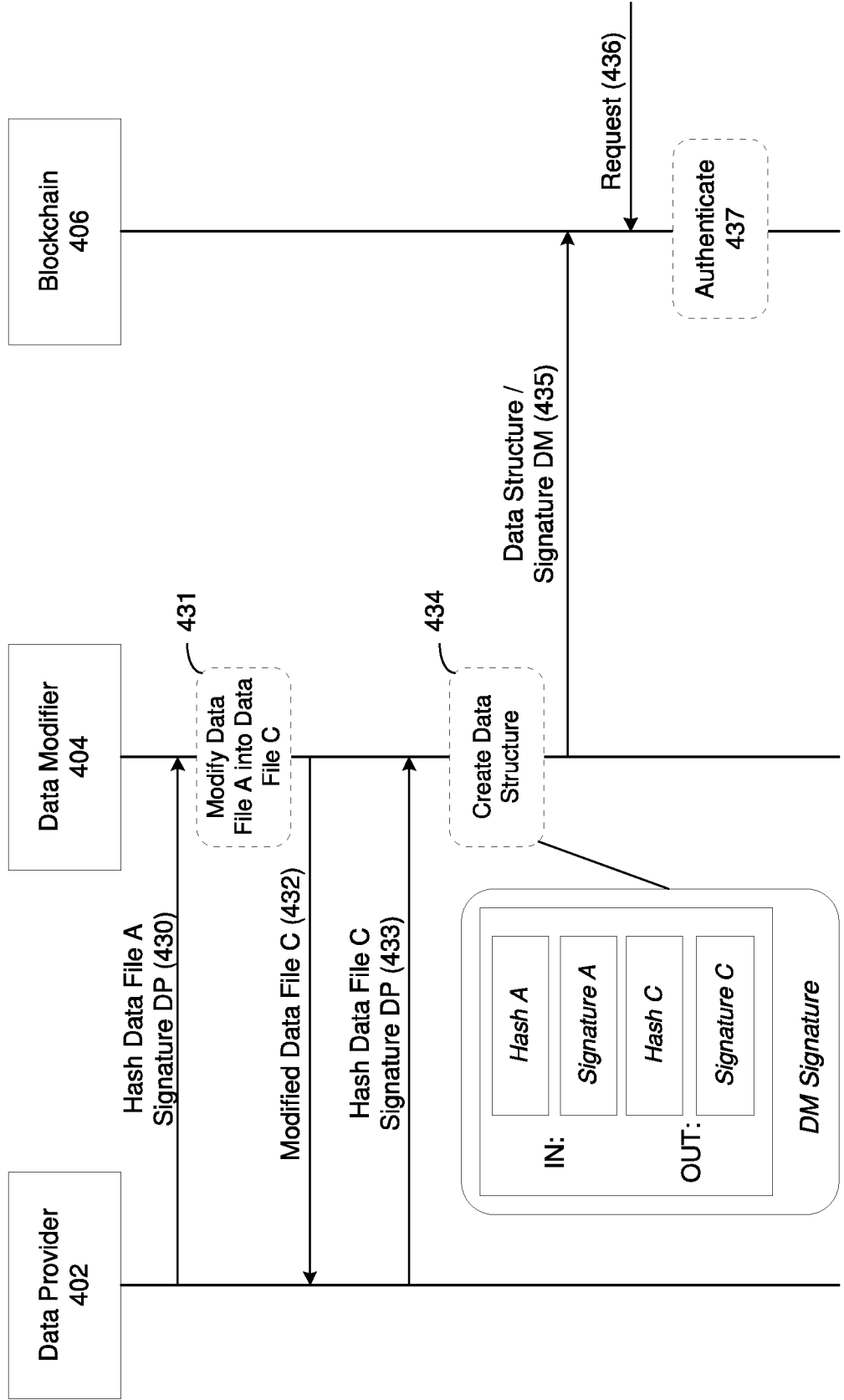
FIG. 4C is a diagram of a data modifier generating a combined data structure with signatures of a data modifier and a data provider and storing it on a blockchain, according to example embodiments.

FIG. 4C illustrates a process 400C of the data modifier 404 generating a combined data structure with signatures of the data modifier 404 and the data provider 402 and storing it on the blockchain 406, according to example embodiments. In this example, only one data structure is provided to the blockchain 406. Here, the data provider 402 provides the hashed data file before modification to the data modifier 404 in 430, while the data modifier 404 modifies the data file in 431 and provides the modified data file to the data provider in 402. Furthermore, the data provider 402 provides the hashed modified data file to the data modifier 404, in 433.

In this example, the data modifier 404 creates a combined data structure, in 434. The combined data structure includes signed hashes of the data file before and after modification which are hashed and signed by the data provider 402. Furthermore, the combined data structure is hashed with a private key of the data modifier 404 and a signature of the data modifier 404 is added to the combined data structure. In 435, the combined data structure is submitted as a single transaction to the blockchain 406, rather than in three separate transactions as described in the examples of FIGS. 4A and 4B. In this case, a request to authenticate the modified data file is received in 436. Here, a public key of the data modifier 404 may be used by a smart contract to decrypt the combined data structure, and a public key of the data provider 402 may be used to decrypt the hashed data file before and after modification. Accordingly, authenticity of the modified data file may be performed by decrypting the combined data structure, in 437, instead of separately decrypting and comparing data provided from the data provider 402 and data provided from the data modifier 404.

Figure 5A:
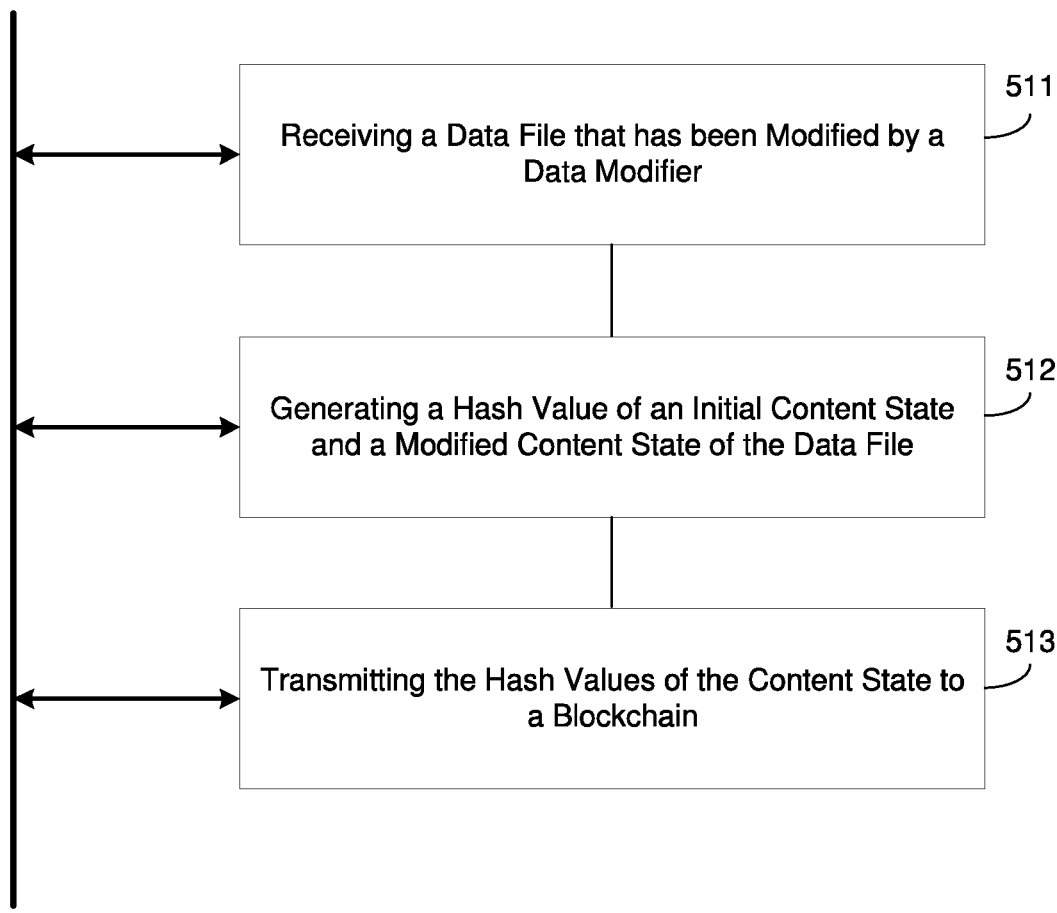
FIG. 5A is a diagram illustrating a method of a data provider generating and storing hash values in a blockchain, according to example embodiments.

FIG. 5A illustrates a method 510 of a data provider generating and storing hash values in a blockchain, according to example embodiments. Any of the methods described herein including the method of FIG. 5A may be performed by a computing system such as the computing system 800 shown in FIG. 8, or the like. For example, the computing system may be a server, a cloud platform, a database, a user device, a combination of devices, and the like. Referring to FIG. 5A, in 511, the method may include receiving, at a data provider, a data file from a data modifier which comprises a modification to an initial content state of a data file. In some embodiments, the method may include first creating the data file and transmitting it to the data modifier. The data file may include an image, a document, an audio file, a video file, or the like, which has had its content modified or otherwise altered by a data modifier. As an example, a doctor may alter a patient's record to include results of tests performed by the doctor. As another example, a government agency may modify a record of a user to reflect a new license obtained, a marriage, a birth of a child, tax information, and the like.

According to various embodiments, the data file may have an initial state which refers to a state of the data file prior to modification, and not necessarily the initial state of the file when it is created. The data file may also include a modified state which refers to the state of the data file after the data modifier has altered the file in some way such as modifying an image, a document, a video, an audio, and the like. The data provider and the data modifier may be systems which are not part of the blockchain and do not have access to a distributed ledger shared by the nodes of a blockchain network. Rather, the data provider and the data modifier as well as the data file which is modified may be disposed "off-chain" from the blockchain and the network of blockchain nodes. In this example, the data provider may include an off-chain data source that provides external data for transacting on a blockchain. The off-chain data may be used to settle transactions, provide proof of an aspect of a contract, provide a receipt, or the like.

In 512, the method may include signing the initial content state of the data file prior to modification with a private key of the data provider to generate a hashed initial content state and signing a modified content state of the data file after the modification with the private key of the data provider to generate a hashed modified content state. Furthermore, in 513 the method may include transmitting the generated hash values to a blockchain peer node for inclusion within one or more data blocks among a hash-linked chain of data blocks. For example, the hash value of the initial content state of the data file may be generated by adding a signature of the data provider to the data file before modification and may be generated and transmitted separately from the modified content state of the data file which is generated by adding a signature of the data provider to the data file after modification.

FIG. 5B illustrates a method 520 of authenticating a modification to a data file based on a data provider signature, according to example embodiments. For example, the method 520 may be performed by a blockchain peer node or a group of peer nodes that are included within a shared blockchain network and which are executing a smart contract to perform the authentication. Referring to FIG. 5B, in 521, the method may include receiving a request to authenticate a data file which has been modified. The request may be received from a data inspector, a data requestor, or the like, which desires proof of the authenticity of the data file from the blockchain. The request may include an identifier of the file such as a file name, a transaction ID, a block number, and/or the like. Here, the data inspector or data requestor may be desiring to conduct a transaction on the blockchain based on content or substance of the data file.

In 522, the method may include retrieving an initial content state of the data file before modification from the blockchain and a modified content state of the data file after modification, from the blockchain. For example, the initial content state may be the initial date file which is hashed with a signature of a private key of a data provider. Meanwhile, the modified content state may be a the modified data file after it has been altered or modified and signed with the private key of the data provider.

In 523, the method may include determining whether the data file is valid based on a public key of the data provider. For example, the blockchain peer node retrieve a public key of the data provider and attempt to decrypt the initial content state of the data file and the modified content state of the data file. If successful, the blockchain peer node may endorse the data file as being valid. In some embodiments, a consensus of blockchain peer nodes within a blockchain network may be needed to certify the authenticity of the modified data file. In this case, a consensus and endorsement process such as shown in the example of FIG. 2B may be performed in an effort to determine whether enough peer nodes have successfully decrypted the initial content state and the modified content state of the data file hashed by the data provider's private key. Furthermore, in response to a determination that the stored data file is valid (e.g., based on a consensus of one or more peer nodes, etc.) in 524 the method may include transmitting information about the data file to the data requestor.

In some embodiments, the retrieving may include retrieving a hash value of the data file (i.e., signed with the private key) before modification and a hash value of the data file after modification from separate transactions among the hash-linked chain of blocks. In some embodiments, the modified content state of the data file may include a change in content to one or more of a document, an image, a video, and an audio, included in the data file. In some embodiments, the transmitting may include transmitting a notification of an authenticity of the data file to the data requester in response to a determination that the stored data file is valid. In some embodiments, the data file may be created by the data provider which is off-chain of the hash-linked chain of data blocks.

Figure 5C:
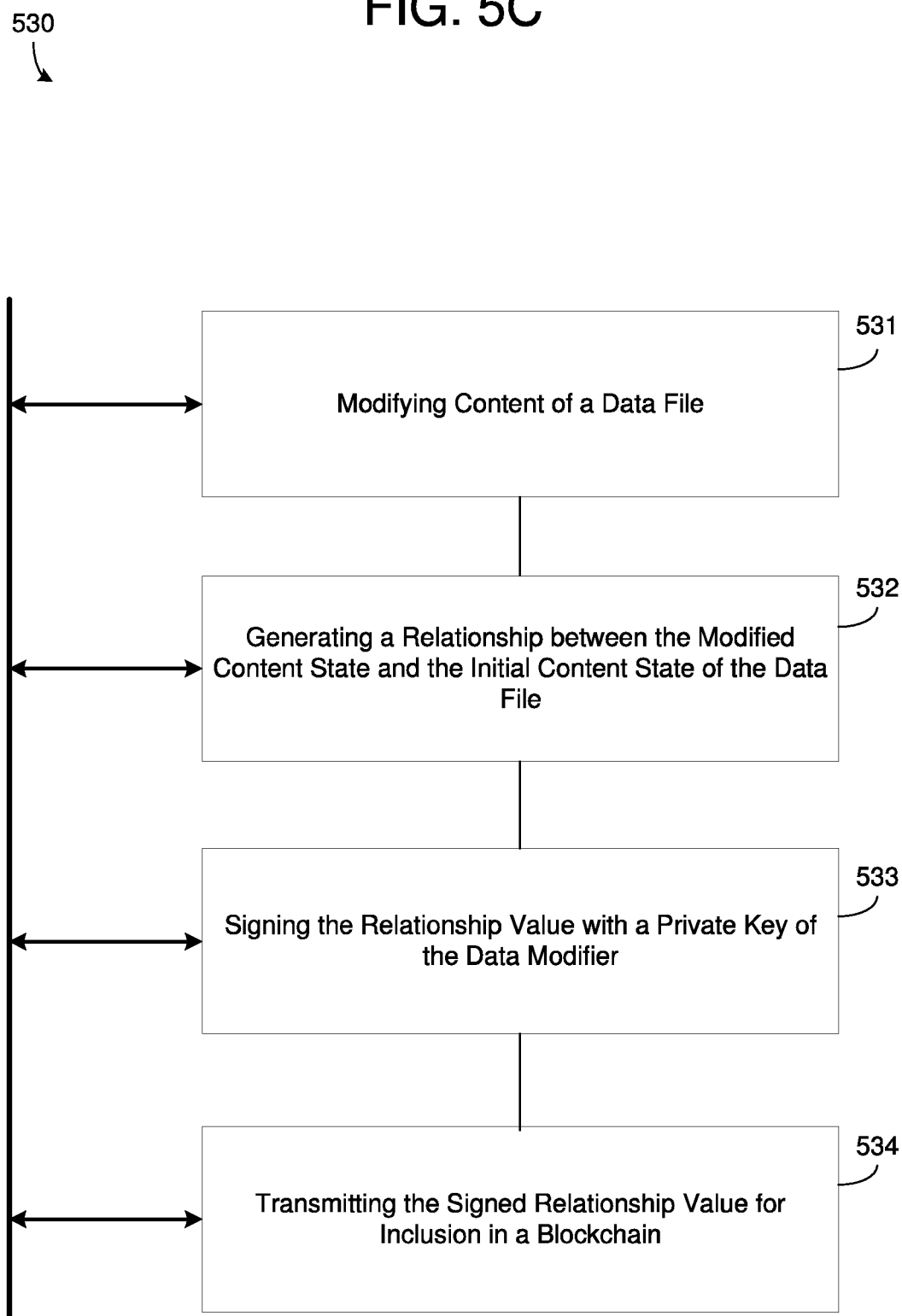
FIG. 5C is a diagram illustrating a method of a data modifier generating a relationship value for a data modification, according to example embodiments.

FIG. 5C illustrates a method 530 of a data modifier generating a relationship value for a data modification, according to example embodiments. Referring to FIG. 5C, in 531, the method may include modifying content of a data file from an initial content state to a modified content state. For example, the modification may include altering content of a document, an image, a video file, an audio file, or the like. Here, the data file may be received from a data provider which has created the data file or holds a copy of the data file.

In 532, the method may include determining a relationship value which identifies a relationship of the modified content state with respect to the initial content state of the data file. The relationship value may include a description, one or more tags, or the like, which provide a description of the changes that have occurred to the initial content state of the file to generate the modified content state of the file. As a non-limiting example, the relationship value may include a text description such as "the modified document includes a notary's signature added to the bottom of the document." As another example, the relationship value may include a hashtag such as # notarized, etc. In some cases, the relationship value may be generated by a user or it may be generated automatically by the data modification system based on the modification performed to the data file. In some embodiments, the relationship value may include a uniform resource identifier (URI) which refers to a network location storing a textual description of a relationship between the initial content state and the modified content state.

In 533, the method may include signing the relationship value with a private key of the data modifier to generate a hashed relationship value, and in 534, transmitting the signed/hashed relationship value to a blockchain peer node for inclusion within one or more data blocks among a hash-linked chain of data blocks.

Figure 5D:
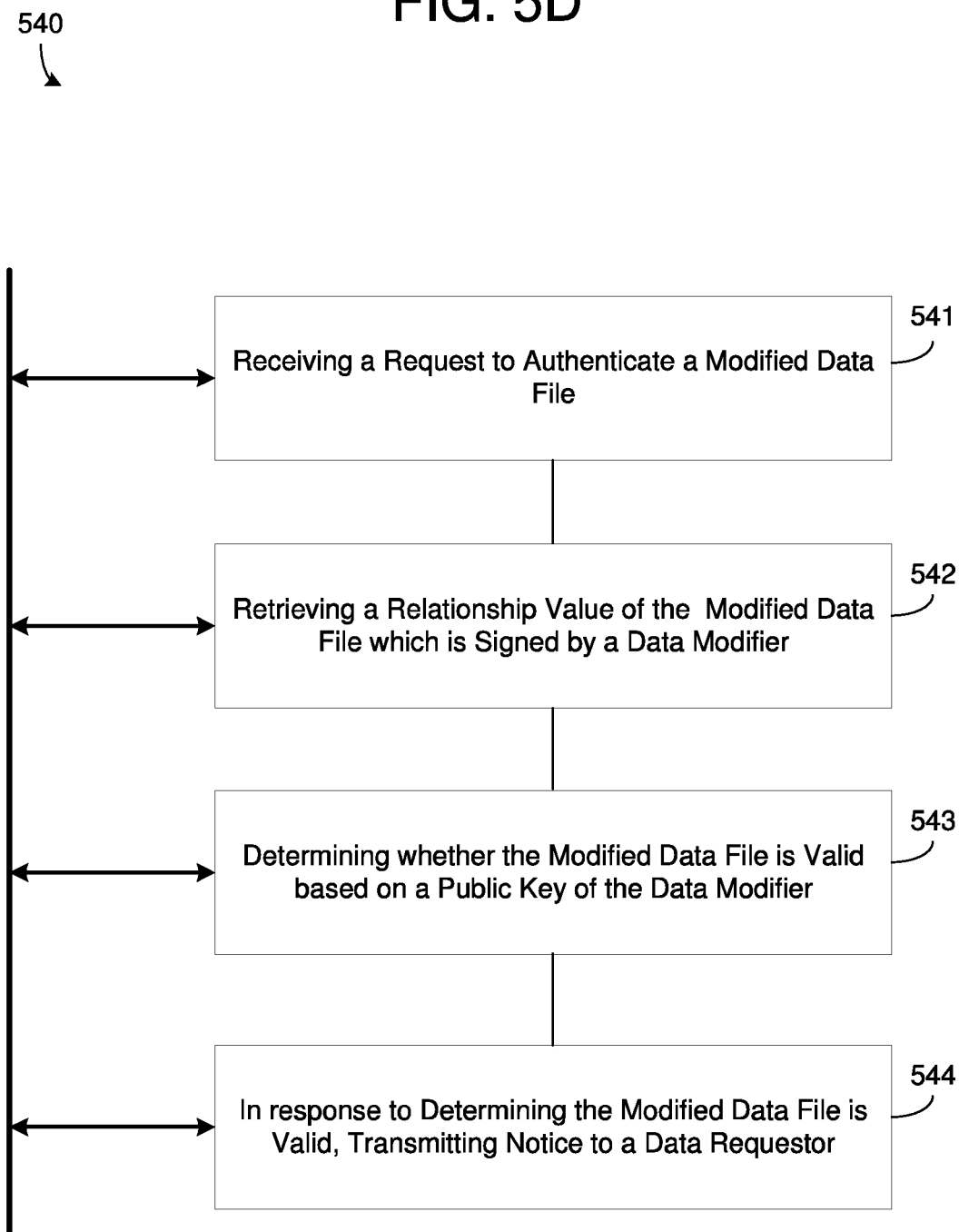
FIG. 5D is a diagram illustrating a method of authenticating a data file based on a relationship value, according to example embodiments.

FIG. 5D illustrates a method 540 of authenticating a data file based on a relationship value, according to example embodiments. For example, the method may be performed by a peer node or a group of peers nodes executing a smart contract. The relationship value may include a relationship between a content state of a data file after modification with respect to a content state of the data file prior to modification. The relationship value may be generated by a data modifier and signed with a private key of the data modifier thereby hashing the relationship value. Referring to FIG. 5D, in 541, the method may include receiving a request to authenticate a data file which has been modified. The request may be received from a data inspector, a data requestor, or the like, which desires proof of the authenticity of the data file from the blockchain. Here, the request may include a transaction ID, a file name, a block number, or the like, of the data file stored on the blockchain.

In 542, the method may include retrieving a relationship value of the data file which has been signed with a private key of a data modifier and stored in one or more blocks of a hash-linked chain of block. For example, the relationship value may identify a relationship between a state of the data file after modification with respect to a state of the data file before modification.

In 543, the method may include determining whether the modified data file is valid based on a public key of the data modifier, and, in response to determining the relationship value is valid, in 544 the method may include transmitting information about the validity or authenticity of the data file to a data requestor. For example, the blockchain peer node retrieve a public key of the data modifier and attempt to decrypt the hashed relationship value of the data file. If successful, the blockchain peer node may endorse the relationship of the modified data file as being valid. In some embodiments, a consensus of blockchain peer nodes within a blockchain network may be needed to certify the authenticity of the modified data file. In this case, a consensus and endorsement process such as shown in the example of FIG. 2B may be performed in an effort to determine whether enough peer nodes have successfully decrypted the relationship value hashed by the data modifier's private key.

In some embodiments, the relationship value may include a textual description of a difference between the initial content state of the data file and the modified content state of the modified data file. In some embodiments, the relationship value may include a tag that designates a relationship between the initial content state and the modified content state. In some embodiments, the relationship value may include a uniform resource identifier (URI) which refers to a network location storing a textual description of the different between the initial content state and the modified content state. In some embodiments, the data file may include one or more of a document, an image, a video, and an audio, created by a data provider and modified by the data modifier, which are off-chain of the hash-linked chain of data blocks.

Figure 5E:
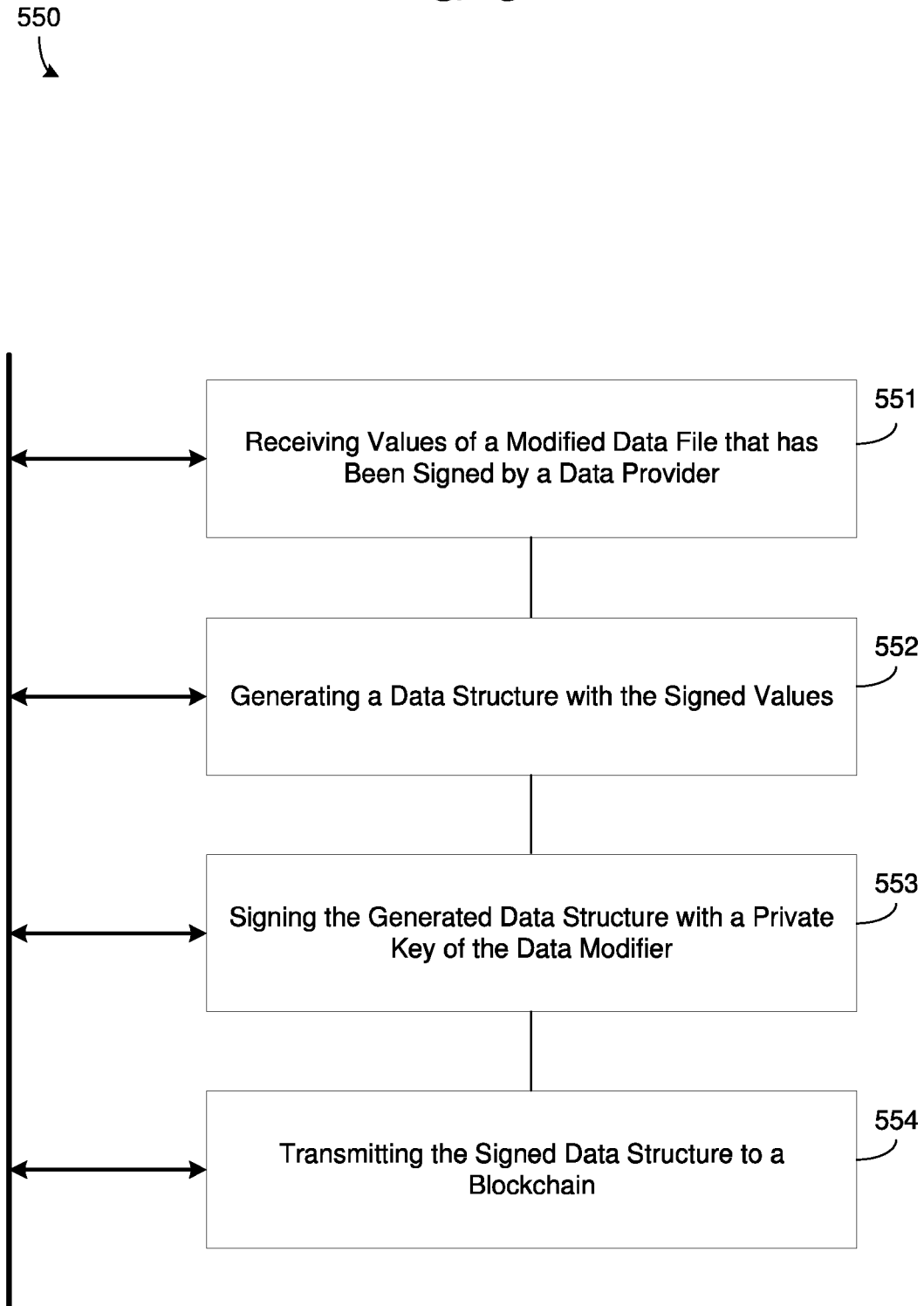
FIG. 5E is a diagram illustrating a method of generating a data structure with signatures of a data provider and a data modifier, according to example embodiments.

FIG. 5E illustrates a method 550 of generating a data structure with signatures of a data provider and a data modifier, according to example embodiments. For example, the method may be performed by a data modifier. Referring to FIG. 5E, in 551, the method may include receiving values of a data file that has been modified, where the values include an initial content state of the data file prior to modification and a modified content state of the data file after modification. Here, the values may be hashed with a private key of a data provider. The hashing may be performed by the data provider signing the initial content state and the modified content state with the private key.

In 552, the method may include generating a data structure which includes the initial content state of the data file and the modified content state of the data file within the same data structure such as a transaction for storage on the blockchain. In 553, the method may include signing the generated data structure with a private key of a data modifier to generate a hashed data structure, and transmitting the hashed/signed data structure to a blockchain peer node for inclusion within one or more data blocks among a hash-linked chain of data blocks.

In some embodiments, the method may further include modifying the data file from the initial content state to the modified content state, prior to receiving the hashed values from the data provider. In some embodiments, the data file may include one or more of a document, an image, a video, and an audio, created by the data provider and modified by the data modifier. In some embodiments, a signature of the data modifier and a signature of the data provider are both included in the generated data structure. In some embodiments, the generated data structure may include a single blockchain transaction for storage on a blockchain.

FIG. 5F illustrates a method 560 of authenticating a data file based on signatures of a data provider and a data modifier according to example embodiments. For example, the method 560 may be performed by a peer node (or group of peer nodes) executing a smart contract. Referring to FIG. 5F, in 561, the method may include receiving a request to authenticate a data file which is created by a data provider and modified by a data modifier. Here, the data file may be stored on a hash-linked chain of blocks.

In 562, the method may include retrieving a data structure signed with a private key of the data modifier from a hash-linked chain of blocks. For example, the data structure may include an initial content state of the data file and a modified content state of the data file which are signed with a private key of the data provider. Here, the private key of the data modifier and the private key of the data provider may be distinct and not shared with each other thereby adding an additional layer of security to the data structure.

In 563, the method may include determining whether the data file is valid based on public keys of the data modifier and the data provider, and in response to determining the data file is valid, in 564 transmitting information about the data file which has been modified to a data requestor. For example, the determining may include attempting to decrypt the data structure based on a public key of the data modifier, and then attempting to decrypt the initial and modified content states of the data file based on a public key of the data provider. In some embodiments, a consensus may be required before the data file is determined to be valid. In this case, a similar endorsement and consensus process such as shown in FIG. 2B may be executed among a plurality of blockchain peer nodes of a blockchain network.

In some embodiments, the method may further include retrieving the initial content state of the data file before modification and the modified content state of the data file after modification from the hash-linked chain of blocks. In some embodiments, the initial content state of the data file and the modified content state of the data file may each be signed separately by the data provider. In some embodiments, a combination of the initial content state of the data file and the modified content state of the data file are signed as a group by the data modifier. In some embodiments, the data file may include one or more of a document, an image, a video, and an audio, created by the data provider and modified by a data modifier, which are off-chain of the hash-linked chain of data blocks.

Figure 6A:
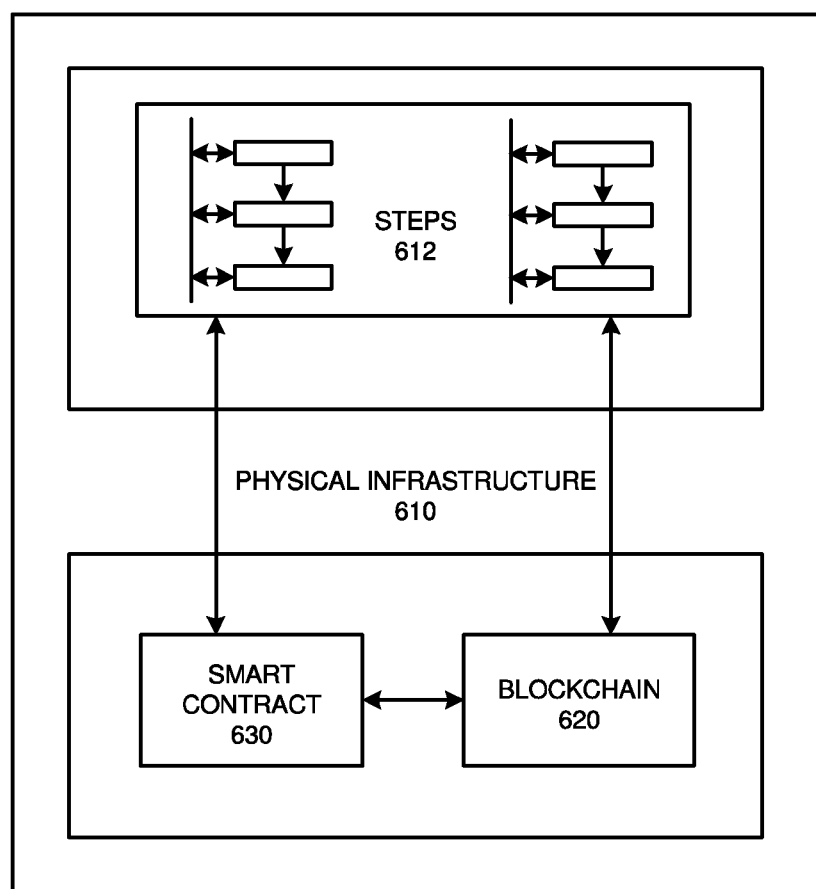
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. According to various embodiments, the steps/operations 612 may include a process of adding modified data content to a blockchain and/or certifying a modified data file through an endorsement and consensus process as described or depicted in one or more flow diagrams and/or logic diagrams. The steps may represent output or written information that is written or read from one or more smart contracts 630 and/or blockchains 620 that reside on the physical infrastructure 610 of a computer system configuration. The data (which can include modified data file information and a validation of the modified data file) can be output from an executed smart contract 630 and/or blockchain 620. The physical infrastructure 610 may include one or more computers, servers, processors, memories, and/or wireless communication devices. In some embodiments, the smart contract 630 also referred to as chaincode may be executed to retrieve blockchain resource information from a blockchain notification board.

Figure 6B:
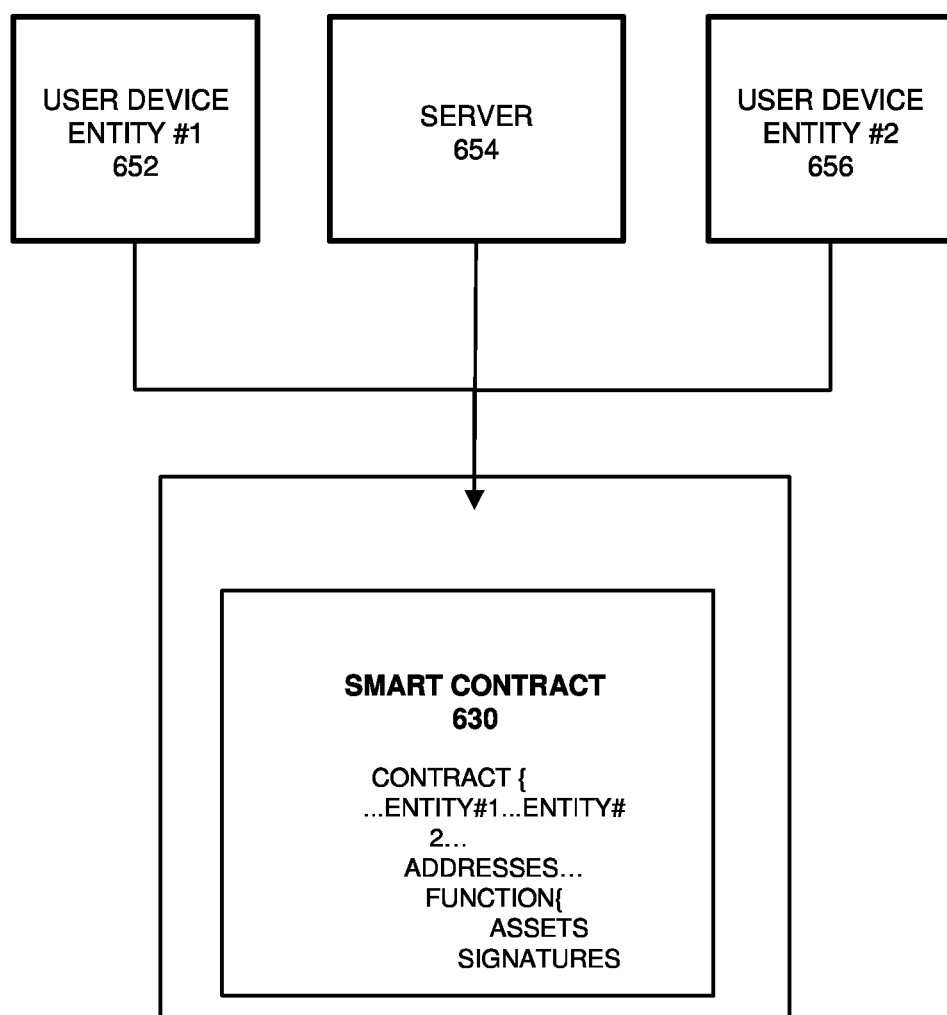
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a modified data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction. For example, in order to validate the authenticity of a modified data file, a consensus of peer nodes may need to sign a successfully decrypted modified data file and provide the signature to another peer node.

Figure 6C:
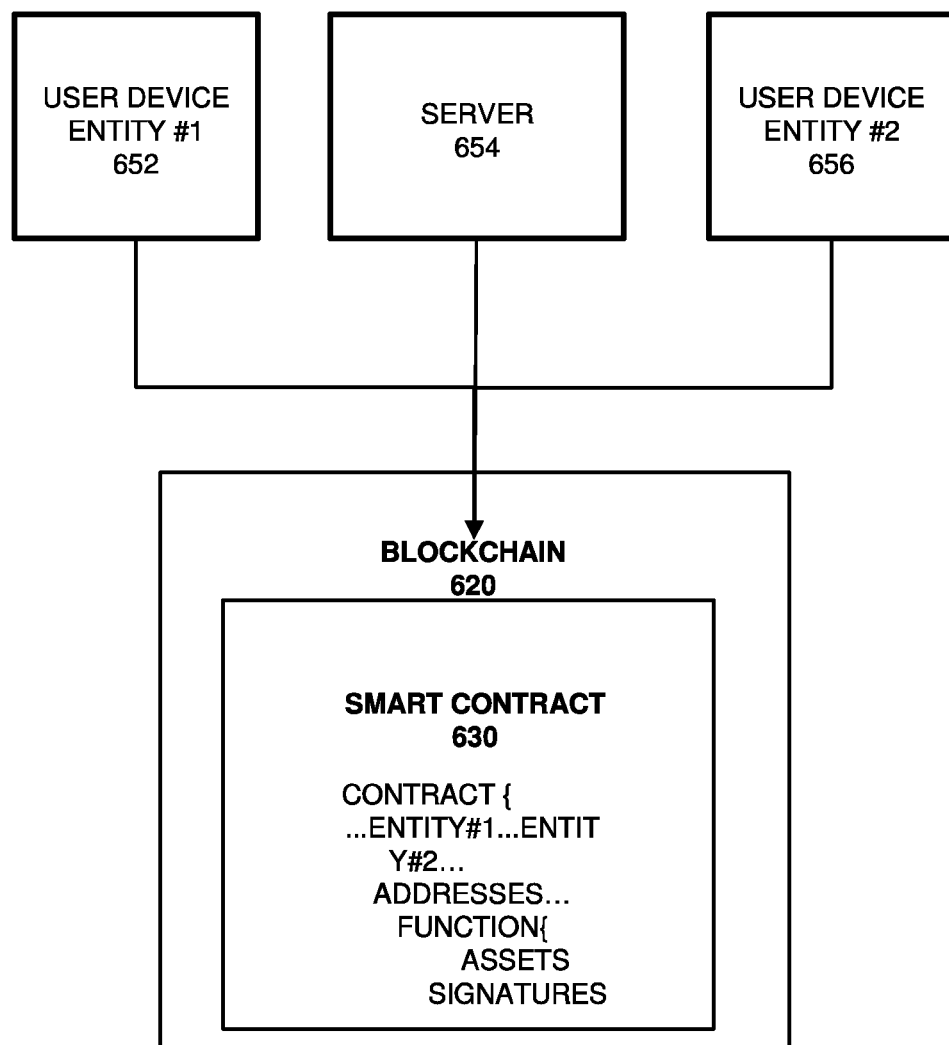
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a modified data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
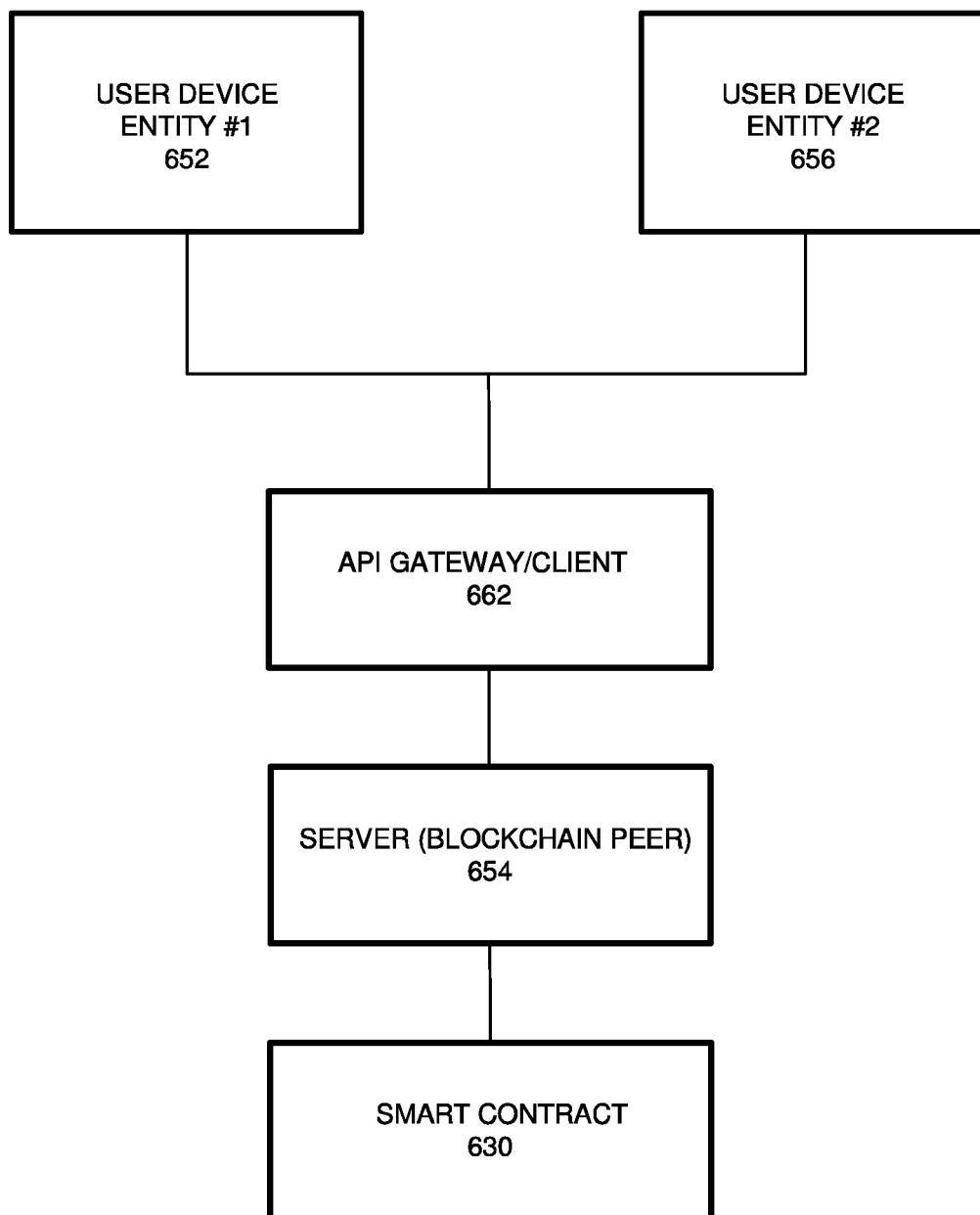
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a KVS) within a distributed ledger allowing clients 652 and 656 to query data on the world state as well as submit transactions into the blockchain network where, depending on the smart contract 630 and endorsement policy, endorsing peers will run the smart contracts 630.

Figure 7A:
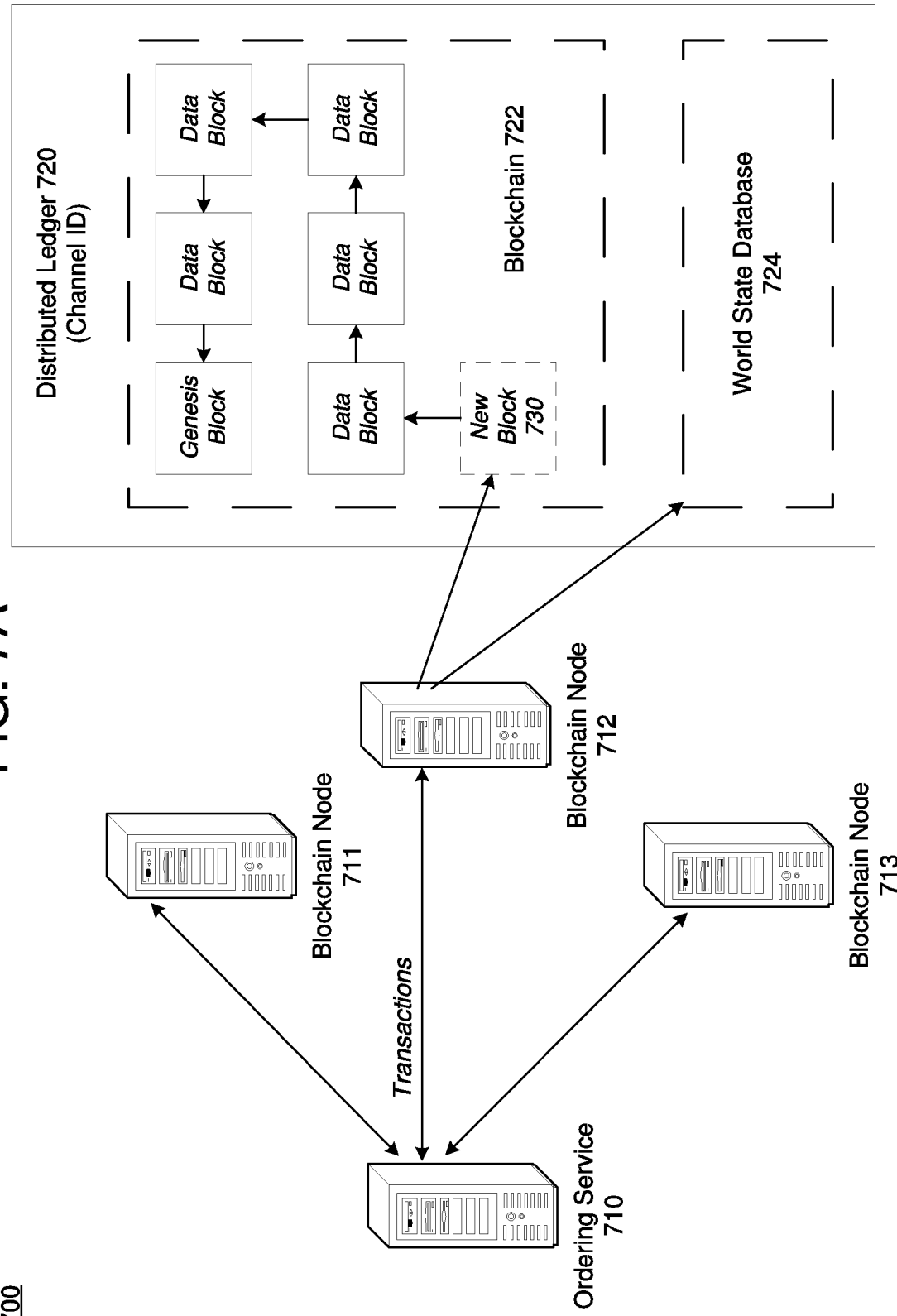
FIG. 7A is a diagram illustrating a process of a new block being added to a blockchain ledger, according to example embodiments.
Figure 7B:
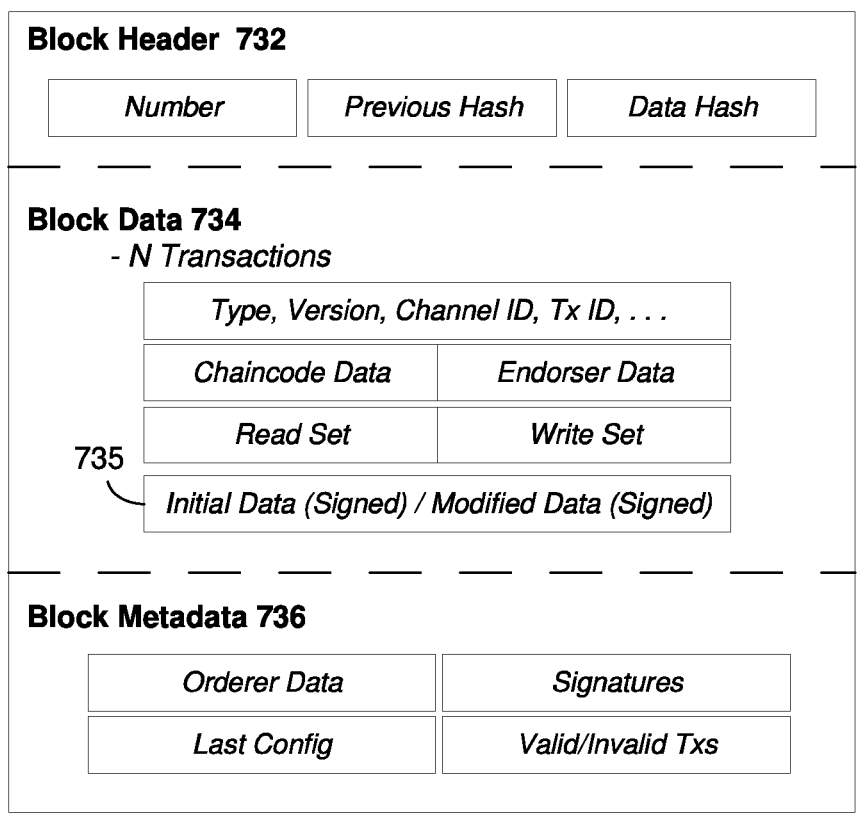
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both. As described herein, transactions may include adding modified data file information from a data provider to a blockchain, adding relationship data of a modified data file information from a data modifier to a blockchain, authenticating a modified data file based on previously added information, and the like.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. For an authentication of a modified data file, the endorsing node may attempt to decrypt a hashed modified data file using a public key of the node that performed the hash. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734. According to various embodiments, each transaction may include modified data file information 735 within the block data 734 that is added by the ordering node 710. The modified data file information 735 may include the content of a modified data file before and after modification which are signed by a data provider, a relationship value signed by a data modifier, and the like.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, the block data 734 section of block 730 may store information about modifications, updates, deletes, additions, or other changes to a file such as a document, a photo, an audio file, a video file, and the like, provided from an external data source within modified data file information 735. The modified data file information 735 may include a hash of the file before modification, a hash of the file after modification, a relationship value describing the modification to the initial content state of the data file, and the like. Each of the information within the modified data file information 735 may be endorsed by one or more of the data provider and the data modifier.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
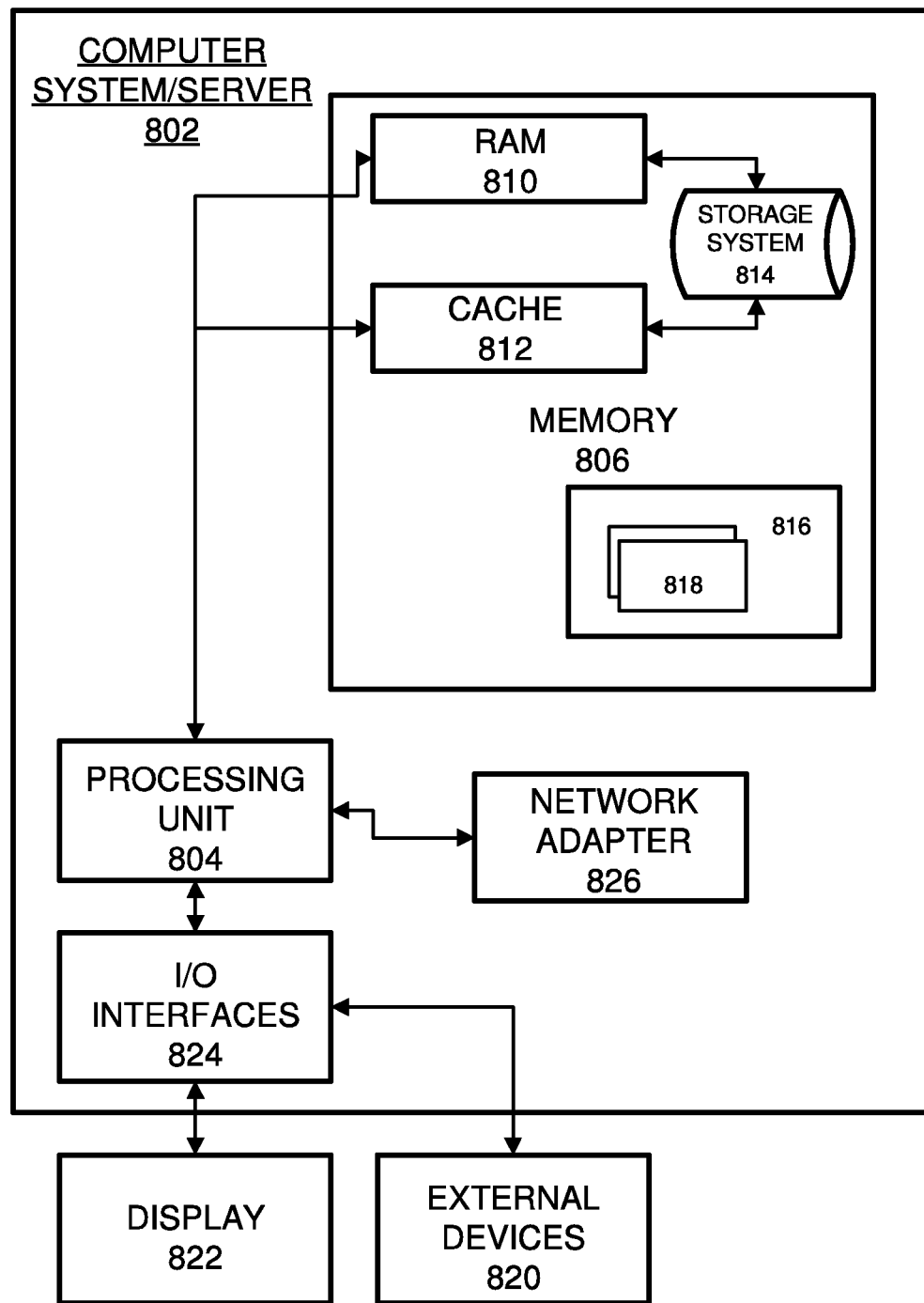
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform any of the methods 510-560 shown and described with respect to FIGS. 5A-5F.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
    a hardware processor configured to
        receive a data file and an initial hash value of the data file comprising a hash of an initial content state of the data file from a data provider system of the data file,
        modify, via a data modification system, content of the data file from the initial content state to a modified content state thereby generating a modified data file, generate an updated hash value comprising a hash of the modified data file, and transmit the modified data file with the modified content state to the data provider system,
        receive a hash of the modified data file from the data provider which has been signed by a key of the data provider system,
        generate a data structure that includes the initial hash value of the data file before the modifying and the updated hash value of the modified data file signed by the data provider system with a key of the data provider system,
        verify the data modification by adding, via the data modification system, a signature to the data structure that includes both the initial hash value of the data file and the signed updated hash value of the modified date file using a key of the data modification system, and
        generate and submit a blockchain transaction that includes the data structure via a blockchain ledger.

2. The computing system of claim 1, wherein the hardware processor is further configured to generate a relationship value that comprises a textual description of a difference between the modified content state of the modified data file and the initial content state of the data file and sign the relationship value with the key of the data modification system.

3. The computing system of claim 2, wherein the relationship value comprises a tag that designates a relationship between the initial content state and the modified content state.

4. The computing system of claim 2, wherein the relationship value comprises a uniform resource identifier (URI) which refers to a network location that stores a textual description of a relationship between the initial content state and the modified content state.

5. The computing system of claim 1, wherein the hardware processor is configured to alter one or more of a document, an image, a video, and an audio, included within the data file to create the modified content state.

6. A method comprising:
    receiving a data file and an initial hash value of the data file comprising a hash of an initial content state of the data file from a data provider system of the data file;
    modifying, via a data modification system, content of the data file from the initial content state to a modified content state thereby generating a modified data file and transmitting the modified data file with the modified content state to the data provider system;
    receiving a hash of the modified data file from the data provider which has been signed by a key of the data provider system;
    generating a data structure that includes the initial hash value of the data file before the modifying and the updated hash value of the modified data file signed by the data provider system with a key of the data provider system;
    verifying the data modification by adding, via the data modification system, a signature to the data structure that includes both the initial hash value of the data file and the signed updated hash value of the modified date file using a key of the data modification system; and
    generating and submitting a blockchain transaction that includes the signed data structure via a blockchain ledger.

7. The method of claim 6, wherein the method further comprises generating a relationship value that comprises a textual description of a difference between the modified content state of the modified data file and the initial content state of the data file and signing the relationship value with the key of the data modification system.

8. The method of claim 7, wherein the relationship value comprises a tag that designates a relationship between the initial content state and the modified content state.

9. The method of claim 7, wherein the relationship value comprises a uniform resource identifier (URI) which refers to a network location storing a textual description of a relationship between the initial content state and the modified content state.

10. The method of claim 6, wherein the modifying comprises altering one or more of a document, an image, a video, and an audio, included within the data file to create the modified data file.

11. A non-transitory computer readable medium comprising instructions, that when read by a processor, cause the processor to perform a method comprising:
   receiving a data file and an initial hash value of the data file comprising a hash of an initial content state of the data file from a data provider system of the data file;
   modifying, via a data modification system, content of the data file from the initial content state to a modified content state thereby generating a modified data file and transmitting the modified data file with the modified content state to the data provider system;
   receiving a hash of the modified data file from the data provider which has been signed by a key of the data provider system;
   generating a data structure that includes the initial hash value of the data file before the modifying and the updated hash value of the modified data file signed by the data provider system with a key of the data provider system;
   verifying the data modification by adding, via the data modification system, a signature to the data structure that includes both the initial hash value of the data file and the signed updated hash value of the modified date file using a private key; and
   generating and submitting a blockchain transaction that includes the signed data structure via a blockchain ledger.

* * * * *